United States Patent
Chang et al.

(10) Patent No.: US 11,755,003 B2
(45) Date of Patent: Sep. 12, 2023

(54) AUTONOMOUS TASK MANAGEMENT INDUSTRIAL ROBOT

(71) Applicant: Hitachi, Ltd., Tokyo (JP)

(72) Inventors: Yi-Chu Chang, Farmington Hills, MI (US); Heming Chen, Novi, MI (US)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 17/490,651

(22) Filed: Sep. 30, 2021

(65) Prior Publication Data

US 2023/0103026 A1    Mar. 30, 2023

(51) Int. Cl.
*G05B 19/418* (2006.01)

(52) U.S. Cl.
CPC ... *G05B 19/41895* (2013.01); *G05B 19/4182* (2013.01); *G05B 19/41865* (2013.01)

(58) Field of Classification Search
None
See application file for complete search history.

(56) References Cited

U.S. PATENT DOCUMENTS

| | | | | |
|---|---|---|---|---|
| 5,742,824 | A * | 4/1998 | Kosaka | B25J 9/1682 712/E9.082 |
| 8,073,567 | B2 * | 12/2011 | Nishi | G05B 19/41815 318/568.14 |
| 11,036,191 | B2 * | 6/2021 | Ooba | G06N 3/084 |
| 11,292,133 | B2 * | 4/2022 | Wouhaybi | B25J 9/1666 |
| 2007/0179671 | A1 * | 8/2007 | Arimatsu | G05B 19/4182 700/247 |
| 2008/0301072 | A1 * | 12/2008 | Nagatsuka | B25J 9/1671 706/12 |
| 2011/0288667 | A1 * | 11/2011 | Noda | G05B 19/42 700/98 |
| 2013/0166621 | A1 * | 6/2013 | Zhu | H04L 67/12 901/50 |
| 2014/0148949 | A1 * | 5/2014 | Graca | B25J 9/1682 700/248 |
| 2014/0259613 | A1 | 9/2014 | Shiota et al. | |
| 2014/0259615 | A1 * | 9/2014 | Fukuda | G05B 19/41865 29/430 |
| 2015/0316922 | A1 * | 11/2015 | Rischar | G05B 19/41855 700/23 |
| 2016/0325439 | A1 * | 11/2016 | Murakami | B24B 41/06 |
| 2017/0185076 | A1 | 6/2017 | Yamamoto et al. | |

FOREIGN PATENT DOCUMENTS

JP      3745906 B2 *    2/2006

* cited by examiner

*Primary Examiner* — Jason Lin
(74) *Attorney, Agent, or Firm* — Procopio, Cory, Hargreaves & Savitch LLP

(57) ABSTRACT

Example implementations described herein involve systems and methods for operation of a robot configured to work on a first process and a second process, which can involve receiving sensor data indicative of a status of one or more of the first process and the second process; for the status indicative of the first process waiting on the robot, controlling the robot to work on the first process; and for the status indicative of the first process not waiting on the robot, controlling the robot to conduct one or more of work on the second process or return to standby.

17 Claims, 11 Drawing Sheets

AUTONOMOUS TASK MANAGEMENT INDUSTRIAL ROBOT

BACKGROUND

Field

The present disclosure is generally directed to industrial systems, and more specifically, to autonomous task management industrial robots.

Related Art

Since the third generation of industry revolution, robots have been used in manufacturing field to replace human beings. Robots can work in repetitive, dangerous, and long-time environments which is harmful to people, so the fields of automotive, foods, and chemistry have been used with industrial robots. However, most robots work on monochrome jobs without flexibility to handle unexpected situations.

The first issue is with respect to the utilization of the robot. Traditionally, each robot works on one process in a fixed position. This method assures regular steps and positions of each process, so people takes the fewest risks to fulfill production as much as possible. What each robot does is either work or stop depending on the need to wait for unprocessed parts. However, once a stoppage occurs in the upstream or downstream, the robot will be in an idle state, which causes a decline in the utilization rate. The second issue is with respect to more efficient utilization of a robot and reduction of idle time.

SUMMARY

Example implementations described herein is directed to facilitating autonomously managing tasks for robots to work more efficiently. The proposed autonomous task management industrial robot facilitates human-like working behavior in a factory to address the above issues.

To address the issues above, example implementations involve robots that work on two or even more processes on a production line. With specific design and localization, the robot does not move but rather works on different processes to optimize the utilization rate.

In example implementations described herein, the robot observes the entire status, including the upstream and downstream stations, while working on its local process, and then takes an appropriate strategy to handle the present situation. For example, a robot can work on Process A when the downstream is congested; however, once the downstream starts to release while Process A has not yet completed, the robot can jump to Process B. Then, the robot can return to Process A after finishing Process B. This strategy has flexibility to reduce the wait and idle time on the production line.

The example implementations described herein can involve the following advantages that can overcome the issues with the related art robot system mentioned above.

Through the example implementations described herein, higher efficiency can thereby be achieved. In example implementations described herein, a robot works as two or more separate stations to enhance its own processing time by utilizing the time when parts are moving on the conveyor. This time can be quite long, especially when an alarm occurs in an upstream or downstream process, even though each timeslot is tiny. Therefore, this method utilizes robots as much as possible and prevents stoppage and idling in production.

Further, the example implementations described herein help to improve robot skills by mimicking human improvement. The robot in example implementations continuously monitors the entire status, such as processes and parts delivery, while doing processing. Such functions allow the robot to take immediate action in unexpected situation occurs. Unlike traditional robot that rigidly executes a regular program, the robot in this system shows adaptivity and flexibility in production line. Therefore, efficiency can be greatly enhanced with the autonomous task management approach.

Further, the example implementations reduce costs, including monetary and spatial costs. Industrial robots need space for processing and safety areas. However, space will be effectively used if the robot at one location can replace multiple stations. Therefore, reducing the number of necessary robots may reduce cost and minimize space on the production line.

Aspects of the present disclosure can involve a method for operation of a robot configured to work on a first process and a second process, the method involving receiving sensor data indicative of a status of one or more of the first process and the second process; for the status indicative of the first process waiting on the robot, controlling the robot to work on the first process; and for the status indicative of the first process not waiting on the robot, controlling the robot to conduct one or more of work on the second process or return to standby.

Aspects of the present disclosure can involve a system for operation of a robot configured to work on a first process and a second process, the system involving means for receiving sensor data indicative of a status of one or more of the first process and the second process; for the status indicative of the first process waiting on the robot, means for controlling the robot to work on the first process; and for the status indicative of the first process not waiting on the robot, means for controlling the robot to conduct one or more of work on the second process or return to standby.

Aspects of the present disclosure can involve a non-transitory computer readable medium, storing instructions for operation of a robot configured to work on a first process and a second process, the instructions involving receiving sensor data indicative of a status of one or more of the first process and the second process; for the status indicative of the first process waiting on the robot, controlling the robot to work on the first process; and for the status indicative of the first process not waiting on the robot, controlling the robot to conduct one or more of work on the second process or return to standby.

Aspects of the present disclosure can involve a robot controller, configured to operate a robot to work on a first process and a second process, the robot controller involving one or more computer readable mediums storing instructions; and a processor, configured to read the instructions from the one or more computer readable mediums to execute a process involving receiving sensor data indicative of a status of one or more of the first process and the second process; for the status indicative of the first process waiting on the robot, controlling the robot to work on the first process; and for the status indicative of the first process not waiting on the robot, controlling the robot to conduct one or more of work on the second process or return to standby.

DETAILED DESCRIPTION

Figure 1:
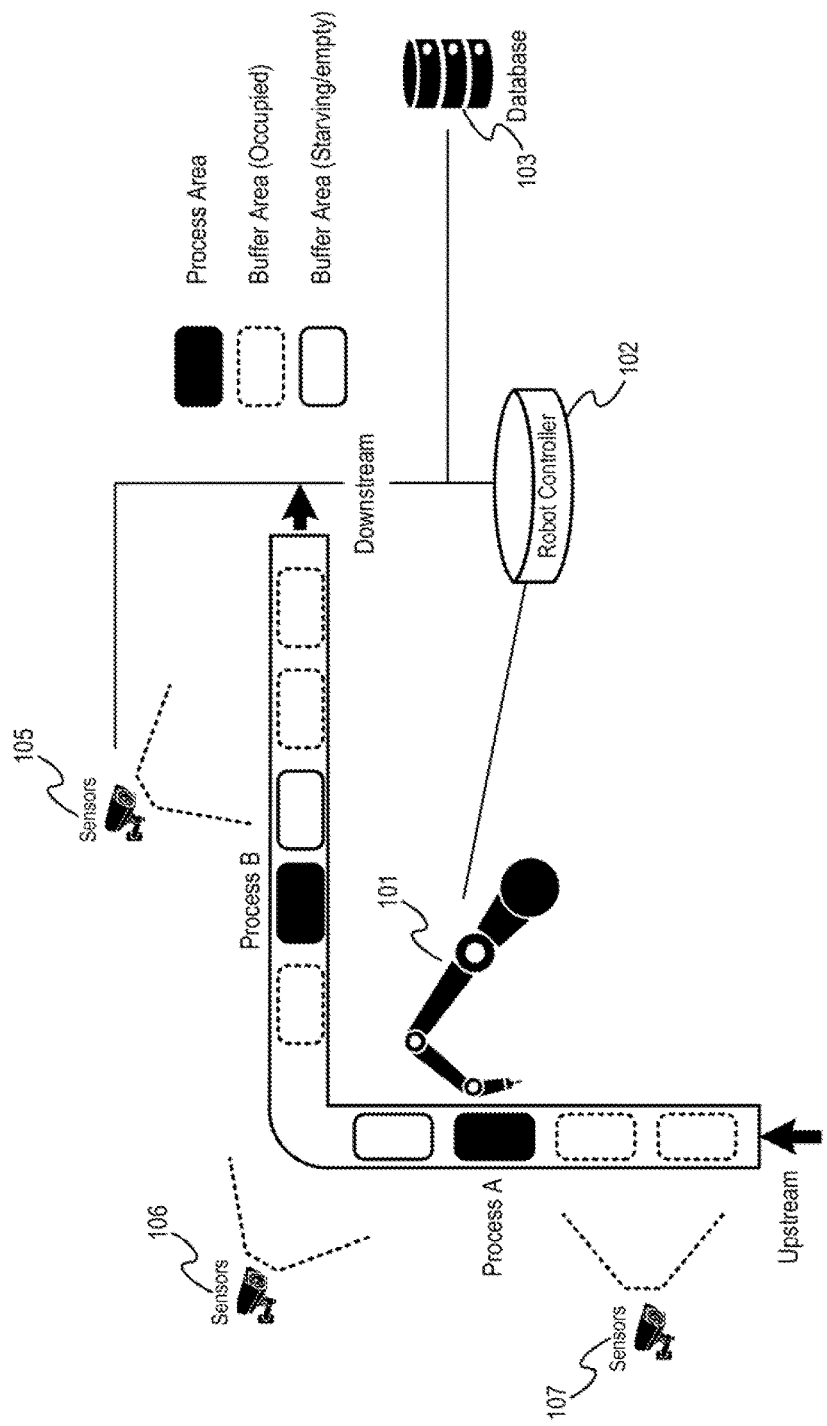
FIG. 1 illustrates an overview of the entire system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an overview of the autonomous task management system, in accordance with an example implementation. The system can involve robot 101, conveyor facilitating the input from the upstream and output to the downstream, controller 102, and database 103.

The robot 101 operates according to a program in the controller 102 and data from database 103. In addition, sensors 105, 106, and 107 continuously collect data during the work processes and send to robot controller 102 so the robot 101 knows the real-time situation of each position. Further, the data will be sent to database 103 for future processes.

Figure 2:
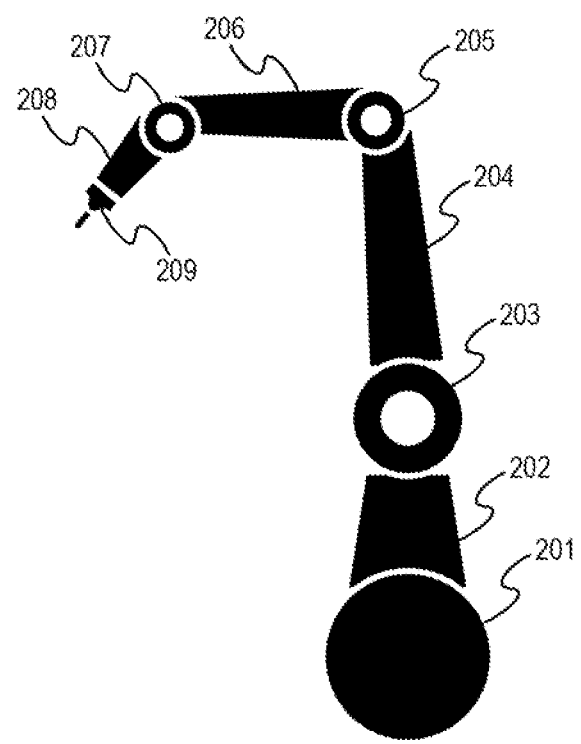
FIG. 2 illustrates an example of industrial robot used by the proposed system in accordance with an example implementation.

FIG. 2 illustrates an example of industrial robot arm used in accordance with an example implementation. The industrial robot arm can involve base joint 201, multiple joints 203, 205, and 207, multiple links 202, 204, 206, and 208, and process tool head 209. Base joint 201, is fixed on the floor and provides rotational degrees of freedom (DOF). Other joints, 203, 205, and 207, provide the same DOF to move the robotic arm with the links 202, 204, 206, and 208. The tool head 209 is changeable depending on the processing station.

Figure 3:
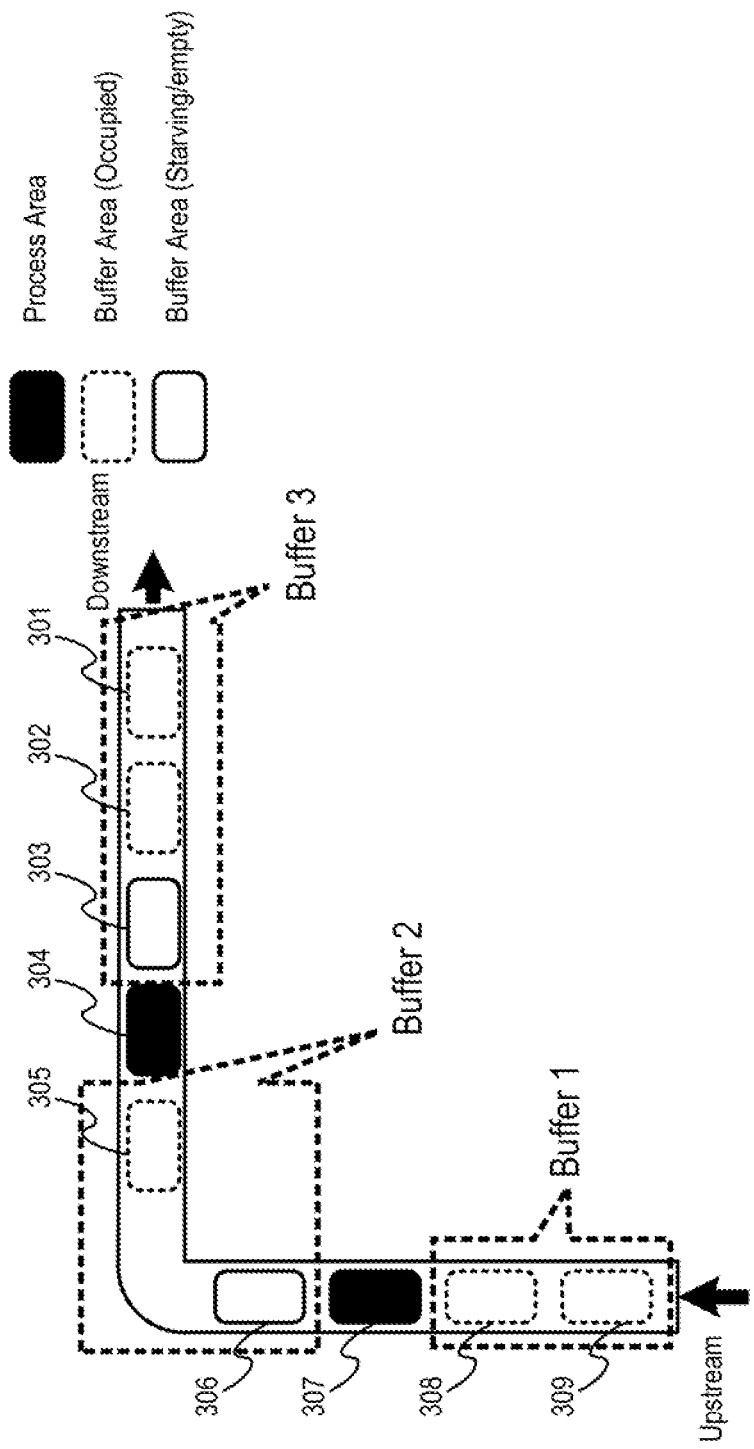
FIG. 3 illustrates an example of the local conveyor and location for each pallet, in accordance with an example implementation.

FIG. 3 is an example of the entire conveyor system, which is strongly related to the function of autonomous task management, in accordance with an example implementation. In an example implementation of the proposed system, there are one conveyor and nine spaces for pallets 301-309, which contains two process areas 304, 307 and seven buffer areas 301, 302, 303, 305, 306, 308, and 309. At the moment illustrated in FIG. 3, two of the buffer areas 303, 306 are starving and five of the buffer areas 301, 302, 305, 308, and 309 are occupied. When and which buffer areas are occupied will affect the task management.

Figure 4A:
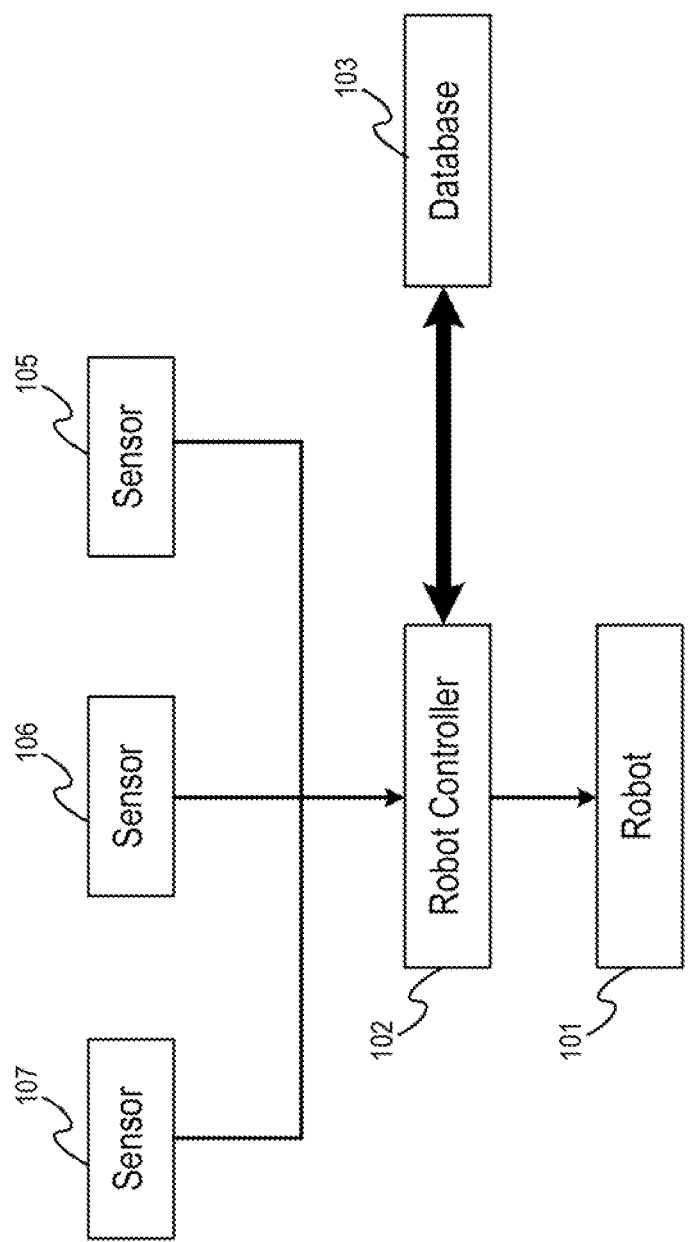
FIG. 4(A) illustrates the communication architecture of the proposed system, in accordance with an example implementation.

FIG. 4(A) illustrates the overall communication architecture of the entire system, in accordance with an example implementation. Robot controller 102, working as a central unit to collect, process, and actuate data and the system, and communicates with sensors 105-107, database 103, and robot 101. Data have been collected by sensors 105, 106, and 107, and sent to the robot controller 102 so that the robot 101 can understand the current situation of the entire system. In addition, robot controller 102 retrieves data from database 103 and then issues a command to the robot 101 after calculation and processing. At the same time, robot controller 102 sends the newly processed data to the database for utilization in next round.

Figure 4B:
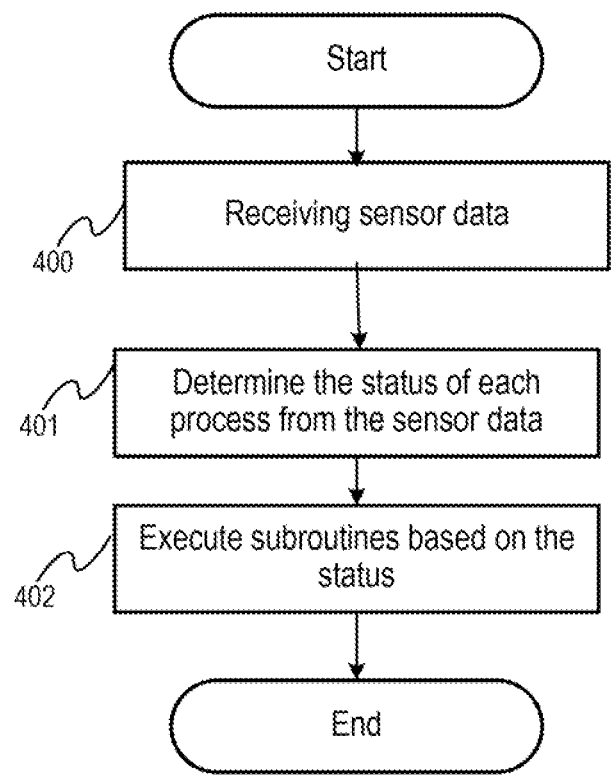
FIG. 4(B) illustrates an example overall workflow, in accordance with an example implementation.

FIG. 4(B) illustrates an overall workflow, in accordance with an example implementation. The overall workflow is based on the example architecture illustrated in FIG. 4(A). At 400, the robot controller 102 receives the data collected by the sensors 105, 106, and 107. At 401, the robot then determines the status of each of the processes based on retrieving data from the database 103. Depending on the desired implementation, the status of each process can be determined based on the buffer as determined from the sensors 105, 106, and 107. For example, if a buffer in the downstream process is full, then completed works in the upstream processes will not be releasable to the buffer, so the upstream processes can be determined to be not waiting for the robot. If the current process is releasable to the downstream buffer, then the robot controller 102 may continue to release to the downstream buffer, and the status can be determined to be that the upstream process is waiting for the robot.

Depending on the desired implementation, sensors 105, 106, and 107 can be in the form of scanning lasers configured to scan the buffers, visual cameras, or otherwise depending on the desired implementation to provide the data. All of the sensor data 105, 106, 107 can be provided to the database 103 so that each robot 101 can access the database 103 and know the statuses of all of the processes at any time.

At 402, the robot executes the appropriate subroutine based on the statuses of the processes. Examples of such are provided in FIGS. 6-9. Depending on the desired implementation, the downstream processes can be prioritized over the upstream processes so as to ensure that the upstream processes are releasable, but can be adjusted otherwise in accordance with the desired implementation.

Figure 5:
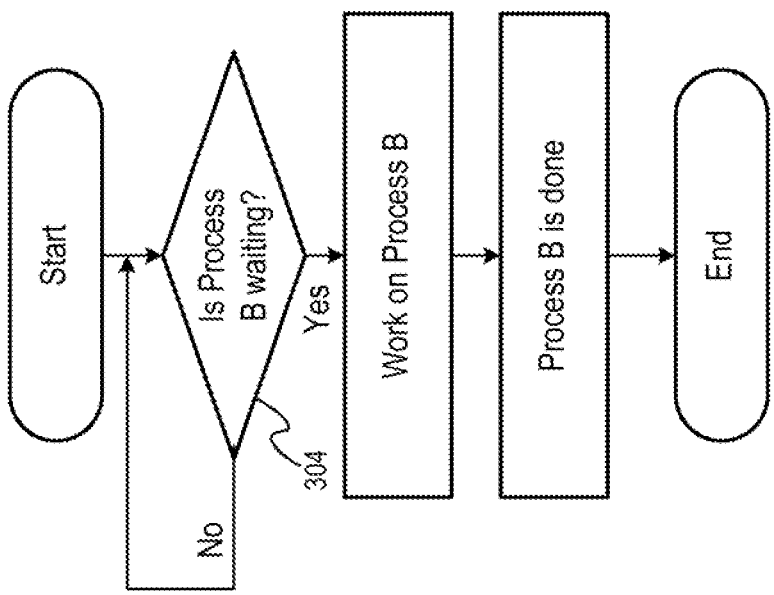
FIG. 5 illustrates the workflow of a related art implementation method with two separate robotic systems.
Figure 5:
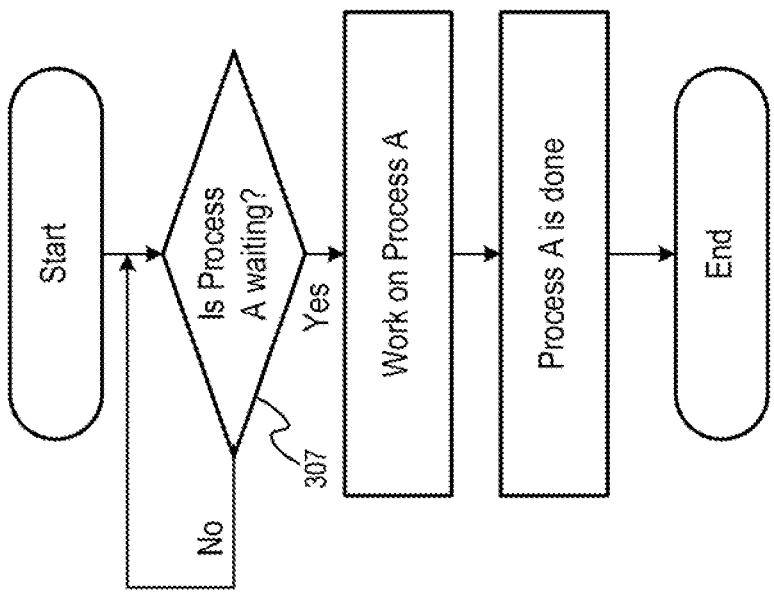

FIG. 5 illustrates the workflow of the related art method with two separate robotic systems. In the related art example of FIG. 5, there are two robotic systems, and each of them works by following the illustrated workflow. In this figure, the left and right flows indicate the robotic system for Process A and Process B, respectively, and they work with the same workflow, which is to process the parts when they are waiting in the processing area.

Figure 6:
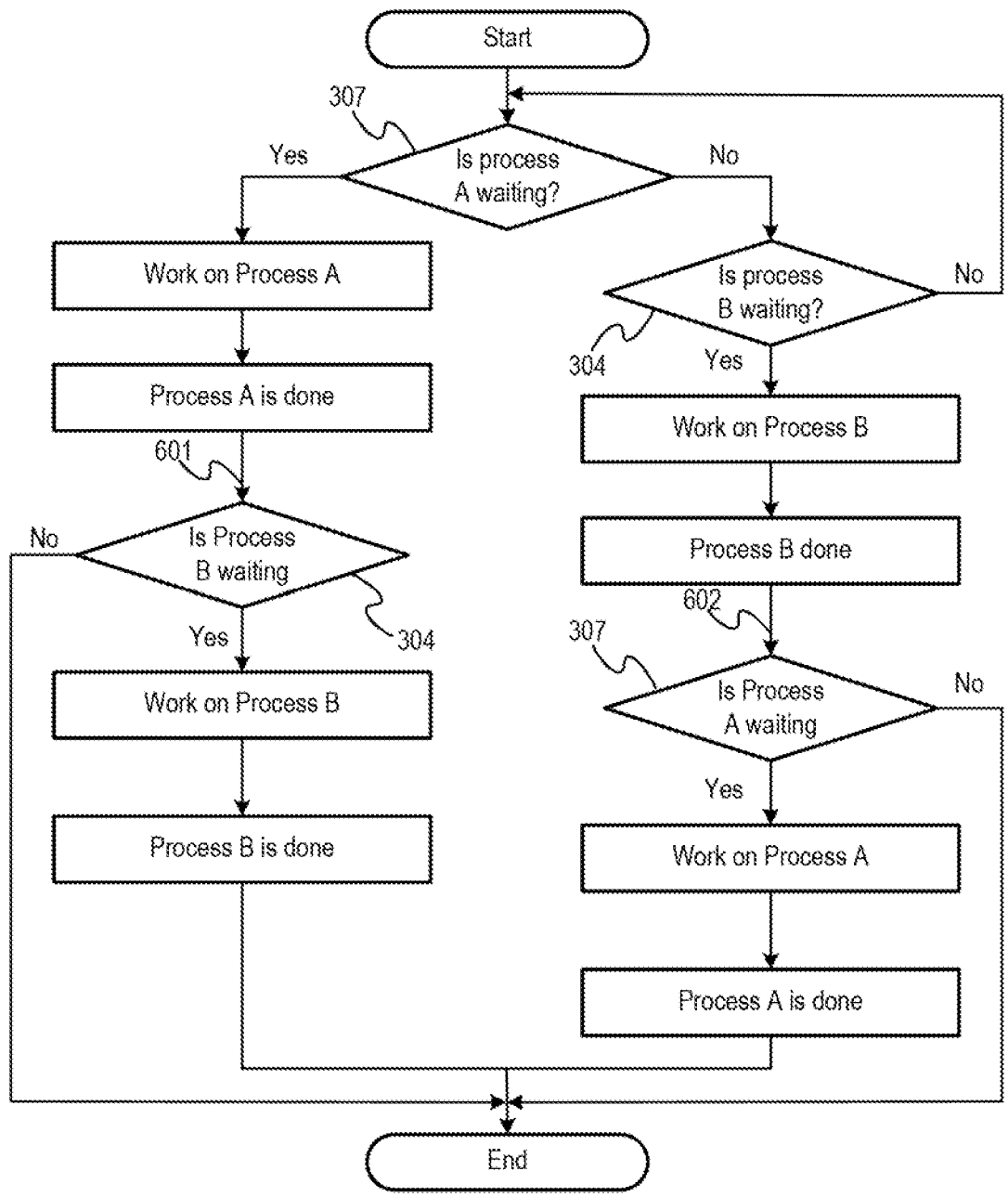
FIG. 6 illustrates the workflow of an example implementation with one robot handling two stations in a normal case.

FIG. 6 illustrates the workflow in a normal case, in accordance with an example implementation. The workflow illustrates that the robot works on both of the stations reciprocally; once Process A is done the robot proceeds to work on Process B as illustrated in 601. Similarly, once Process B is done, the robot jumps back to Process A as illustrated in 602. In example implementations, FIG. 6 can be invoked after Buffer 3 is full in view of the overall flow of FIG. 4, but can also be invoked generally in accordance with the desired implementation.

Figure 7:
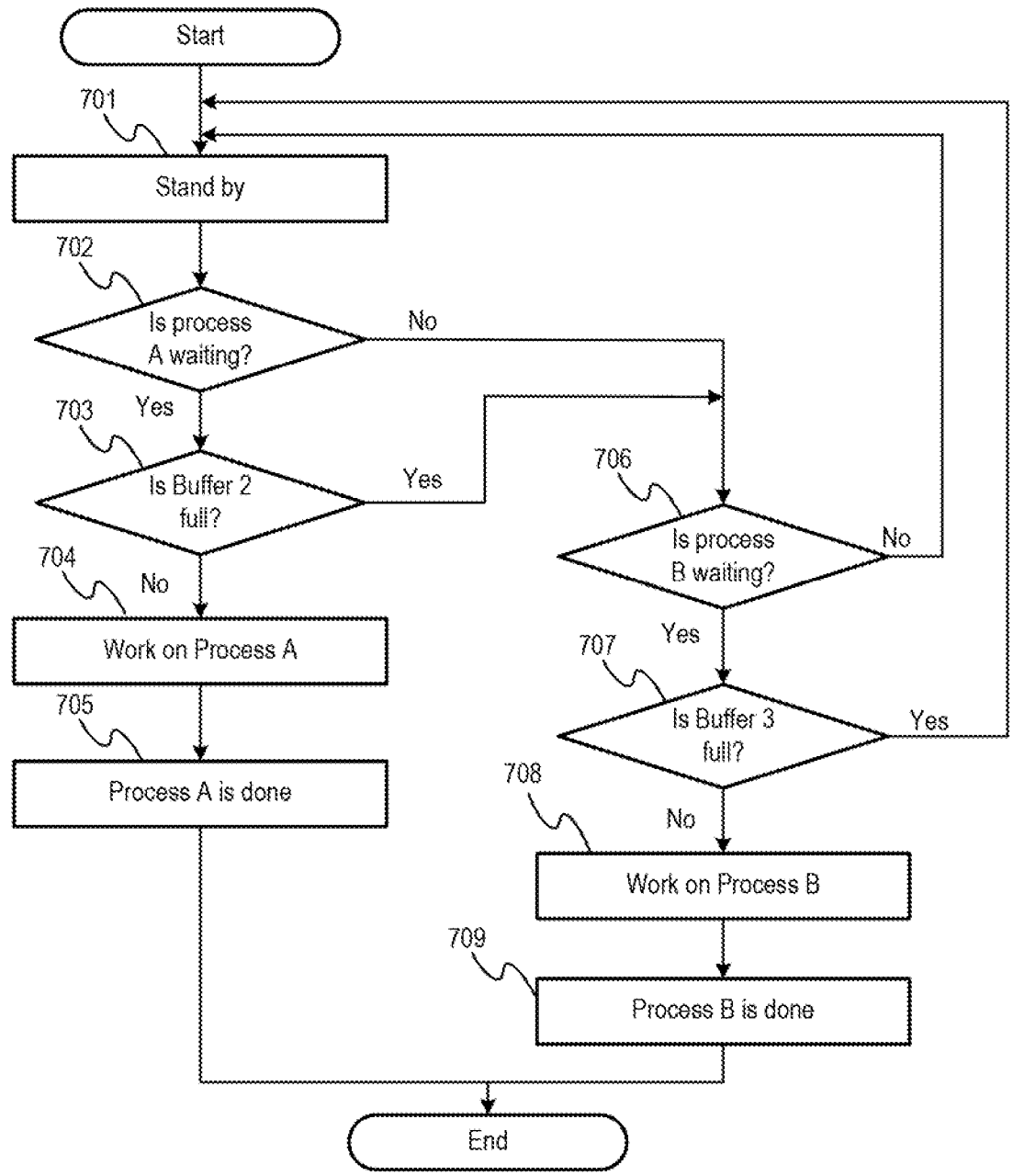
FIG. 7 illustrates the workflow for the robot to decide where to operate first depending on on-site situation, in accordance with an example implementation.

FIG. 7 is an example workflow through which a robot can decide what to work on first depending on the on-site situation, in accordance with an example implementation. In FIG. 7, the workflow shows an example that a robot decides what to work on first depending on the current situation of the exit buffer, with the example described with respect to FIG. 1 and FIG. 3. Buffers are monitored by sensors 105, 106, and 107 continuously. In an example, suppose a part comes to Process A but Buffer 2 is full, which means the coming part will continue to remain in Station A after processing. Therefore, the robot will try to work on Process B if a part is waiting at Station B and then robot will jump back to Process A.

In the flow of FIG. 7, the robot may be set at standby 701 for a predetermined amount of time in accordance with the desired implementation. At 702, the robot will then determine if Process A is waiting. If so (Yes) then the flow proceeds to 703, otherwise (No), the flow proceeds to 706. At 703, the robot determines if Buffer 2 is full. If so (Yes), then the flow proceeds to 706, otherwise (No), the flow proceeds to 704 to work on Process A until Process A is completed at 705.

At 706, the robot determines if Process B is waiting. If not (No), then the process proceeds back to standby at 701. Otherwise (Yes), the flow proceeds to 707 to determine if Buffer 3 is full. If so (Yes), then the flow proceeds to standby at 701, otherwise (No) the flow proceeds to 708 to work on Process B until Process B is done at 709.

Figure 8:
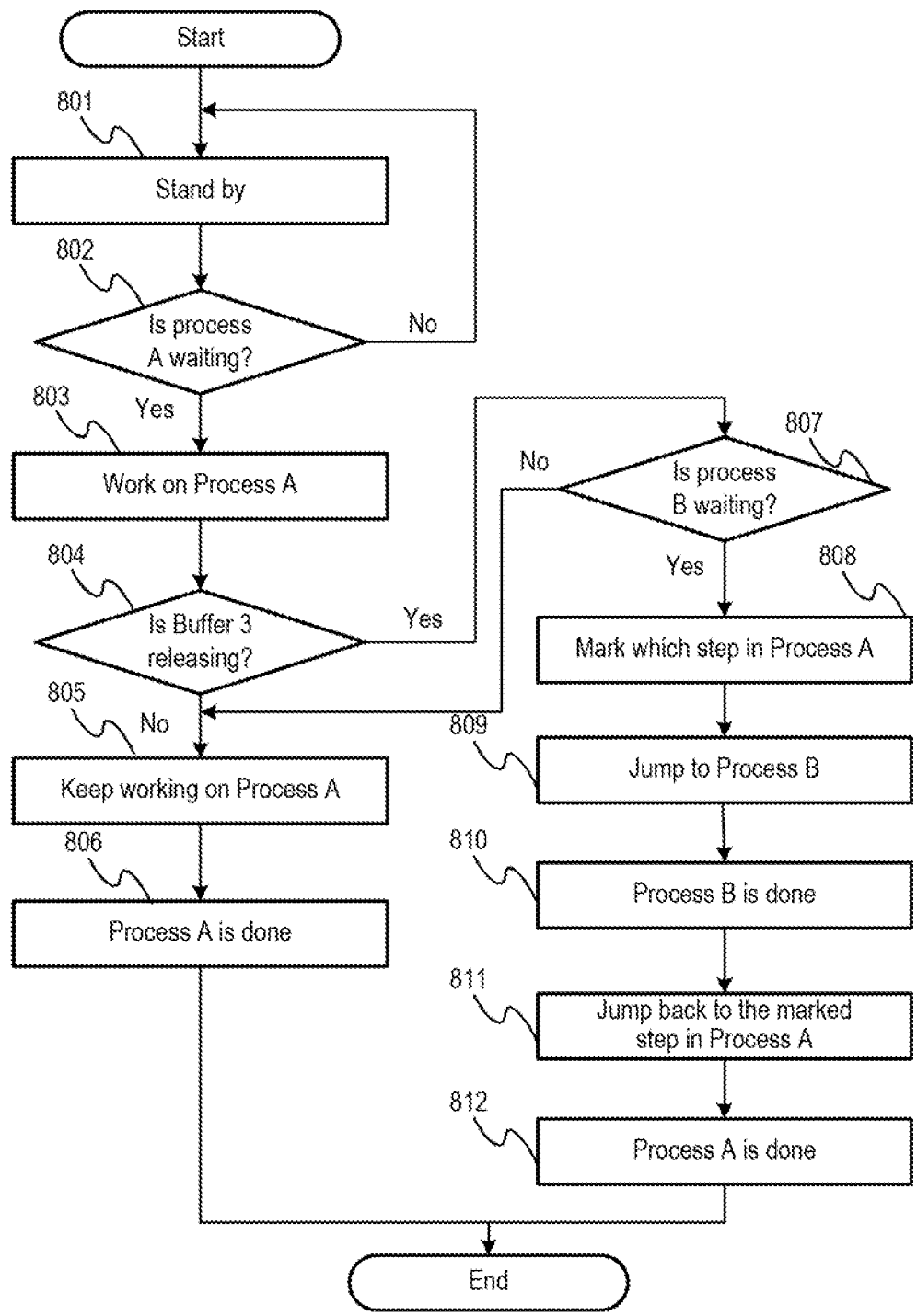
FIG. 8 illustrates the workflow through which the robot may be interrupted, in accordance with an example implementation. This figure indicates that the robot jumps to Process B and then back to Process A.

FIG. 8 illustrates an example workflow through which the robot may be interrupted during a process, in accordance with an example implementation. In this figure, the robot keeps receiving data from sensors 105, 106, and 107 while working on Process A, which is same as that in FIG. 7 using the example of FIG. 1 and FIG. 3. If Buffer 3 is still full, the robot will focus on Process A; however, once Buffer 3 starts releasing while robot works on Process A, the robot may jump to Process B and come back to Process A in order to address the traffic situation on the conveyor.

At 801, the robot waits on standby for a predetermined period of time in accordance with the desired implementation. At 802, the robot determines if Process A is waiting. If not (No), then the flow proceeds back to 801 to standby, otherwise (Yes) the flow proceeds to 803. At 803, the robot works on Process A and proceeds to 804 in which the robot determines if Buffer 3 is releasing. If so (Yes), then the flow proceeds to 807, otherwise (No) the flow proceeds to 805. At 805, the robot continues to work on Process A until the process is done at 806.

At 807, the robot determines if Process B is still waiting. If so (Yes), then the flow proceeds to 808, otherwise (No), the robot continues to work on Process A at 805.

At 808, the robot logs which step in Process A it is currently working on. At 809, the robot jumps to Process B and works on it until Process B is done at 810. At 811, the robot then returns to the logged step in Process A and then continues to work on Process A until it is done at 812.

Figure 9:
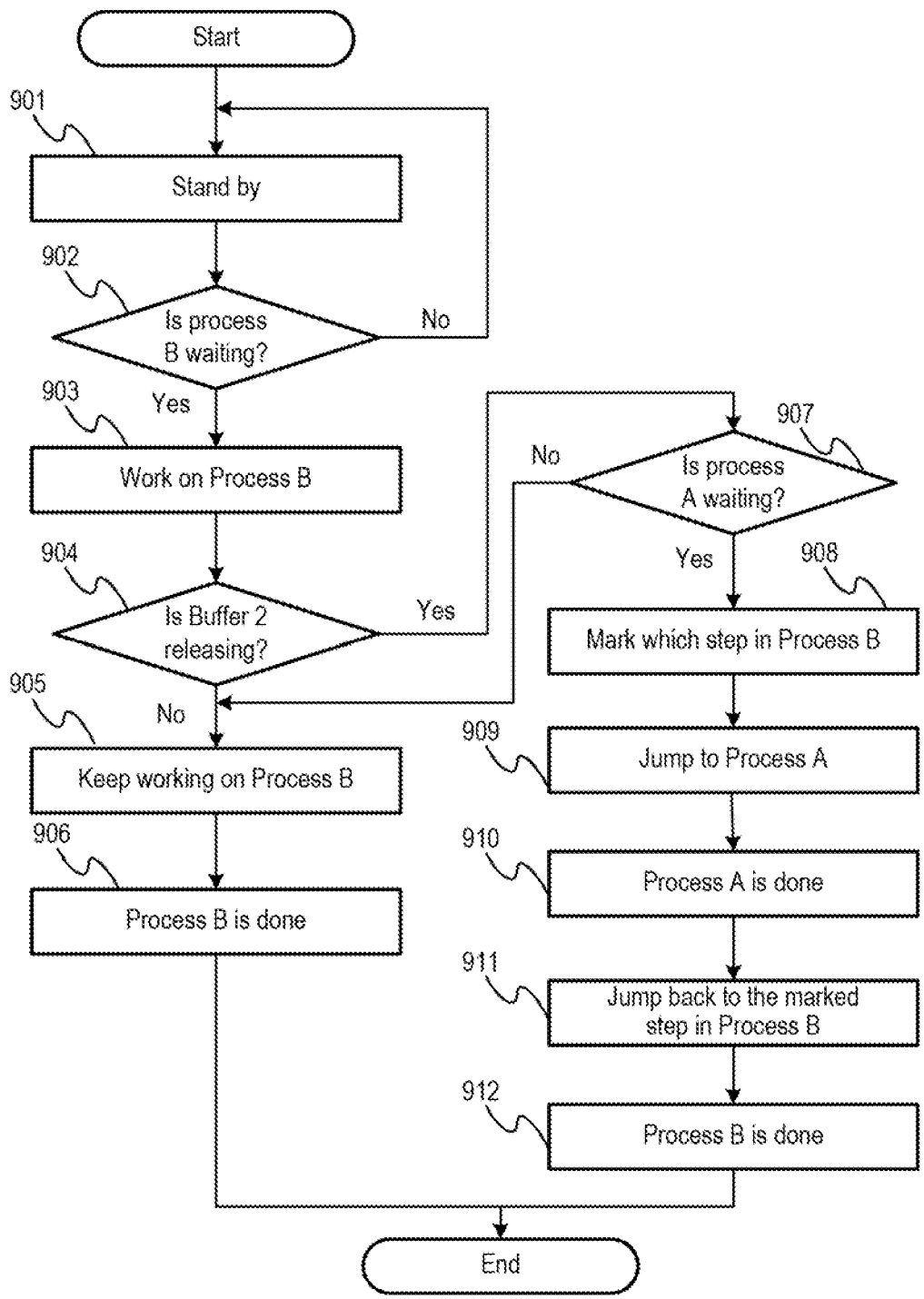
FIG. 9 illustrates the workflow through which the robot may be interrupted, in accordance with an example implementation. This figure indicates robot jumps to Process A and then back to Process B.

FIG. 9 illustrates the workflow through which the robot may be interrupted during a process in a manner similar to FIG. 8, in accordance with an example implementation. In this figure, the robot keeps receiving data from sensors 105, 106, and 107 while working on Process B, using the example of FIG. 1 and FIG. 3. Once a part comes to Process A and Buffer 3 is still full, the robot may jump to Process A for the part, and then come back to Process B after finishing Process A. This function is the same as that in FIG. 8 to minimize the waiting time of each part on the conveyor.

At 901, the robot waits on standby for a predetermined period of time in accordance with the desired implementation. At 902, the robot determines if Process B is waiting. If so (Yes), the flow proceeds to 903, otherwise (No) the flow proceeds back to standby at 901.

At 903, the robot proceeds to work on Process B. At 904, the robot determines if Buffer 2 is releasing. If so (Yes), the flow proceeds to 907, otherwise (No) the flow proceeds to 905 to work on Process B until it is done at 906.

At 907, the robot determines if Process A is waiting. If not (No), then the flow proceeds to 905 to work on Process B. Otherwise (Yes), the flow proceeds to 908, wherein the robot logs which step in Process B it is currently working on. At 909, the robot jumps to Process A and works on it until Process A is done at 910. At 911, the robot then returns to the logged step in Process B and then continues to work on Process B until it is done at 912.

Through the example implementations described herein, the autonomous task management industrial robot can be applied to any production line, such as automotive, food, and oil & gas industries. To work on two or even more separate stations, the robot can be located at the curve of conveyor for larger handling area from robot.

Figure 10:
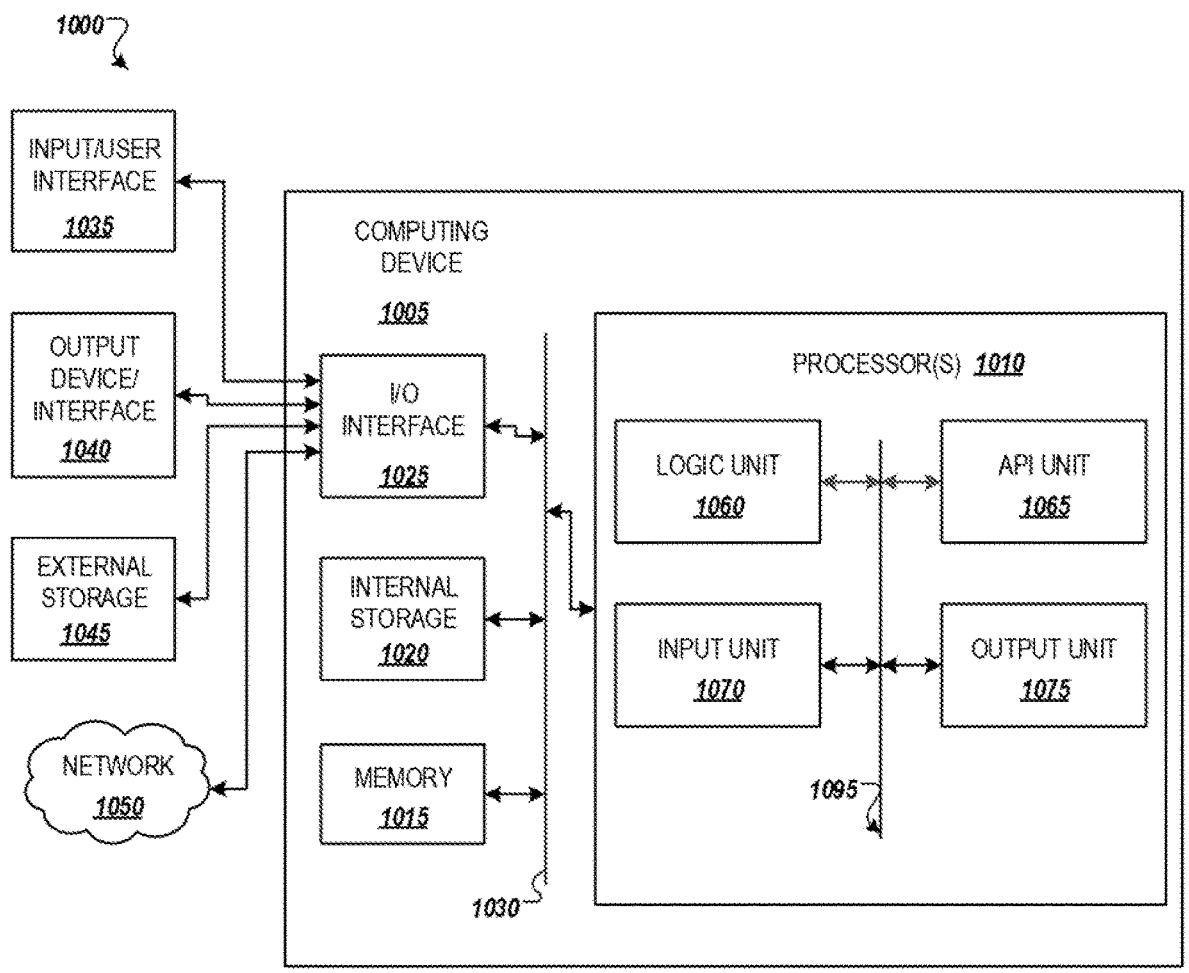
FIG. 10 illustrates an example computing environment with an example computer device suitable for use in some example implementations.

FIG. 10 illustrates an example computing environment with an example computer device suitable for use in some example implementations, such as a robot controller 102 configured to control a robot 101 as illustrated in FIG. 1 and FIG. 4(A).

Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

In example implementations, the computing device 1005 can be used as a robot controller, configured to operate a robot to work on a first process and a second process to work with one or more computer readable mediums storing instructions. Processor(s) 1010 can be configured to read the instructions from the one or more computer readable mediums to execute a process involving the following aspects.

In a first aspect, the instructions can involve receiving sensor data indicative of a status of one or more of the first process and the second process; for the status indicative of the first process waiting on the robot, controlling the robot to work on the first process; and for the status indicative of the first process not waiting on the robot, controlling the robot to conduct one or more of work on the second process or return to standby as illustrated in FIGS. 1, 4(A), 4(B) and 6.

In a second aspect, there can be instructions as that in the first aspect wherein the first process is an upstream process on a conveyor and the second process is a downstream process on the conveyor as illustrated in FIG. 1 and FIG. 3.

In a third aspect, there can be instructions as that in any of the above aspects, wherein the instructions for controlling the robot to work on the first process further involves, for a buffer feeding into the second process not being full, work on the first process to completion; and for the buffer feeding into the second process being full, determining if the status is indicative of the second process waiting for the robot; and for the status being indicative of the second process waiting on the robot, controlling the robot to work on the second process to completion if another buffer feeding into a third process is not full, and returning the robot to standby if the another buffer into the third process is full as illustrated in FIG. 7, 701-705.

In a fourth aspect, there can be instructions as that in any of the above aspects, wherein the instructions for controlling the robot to work on the second process further involves, for the status being indicative of the second process waiting on the robot, controlling the robot to work on the second process to completion if another buffer feeding into a third process is not full, and returning the robot to standby if the another buffer into the third process is full; and for the status being indicative of the second process not waiting on the robot, returning the robot to standby as illustrated in FIG. 7, 706-709.

In a fifth aspect, there can be instructions as that in any of the above aspects, wherein the instructions for controlling the robot to work on the first process involves, for a releasing of a buffer feeding from the second process to a third process and for the status being indicative of the second process waiting on the robot, logging a current work step of the robot on the first process; controlling the robot to work on the second process to completion; and controlling the robot to resume working on the first process from the logged current work step after completion of the second process as illustrated in FIG. 8.

In a sixth aspect, there can be instructions as that in any of the above aspects, wherein the instructions for controlling the robot to conduct one or more of work on the second process involves, for a releasing of a buffer feeding into the second process and for the status being indicative of the first process waiting on the robot, logging a current work step of the robot on the second process; controlling the robot to work on the first process to completion; and controlling the robot to resume working on the second process from the logged current work step after completion of the second process as illustrated in FIG. 9.

In a seventh aspect, there can be a method involving any of the above aspects.

In an eight aspect, there can be a system involving means for executing the instructions of any of the first through sixth aspects.

In a ninth aspect, there can be a non-transitory computer readable medium storing any of the instructions of the first through sixth aspects.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for operation of a robot configured to work on a first process and a second process, the method comprising:
    receiving sensor data, wherein the sensor data indicates a status of one or more of the first process and the second process; and
    determining that the sensor data indicates that the first process is waiting on the robot, in response to determining that the sensor data indicating that the first process is waiting on the robot, determining that a buffer feeding into the second process is full, in response to determining that the buffer feeding into the second process is full, determining that the sensor data indicates that the second process is waiting on the robot, in response to determining that the sensor data indicating that the second process is waiting on the robot, determining that another buffer feeding into a third process is not full, in response to determining that the another buffer feeding into the third process is not full, controlling the robot to work on the second process to completion.

2. The method of claim 1, wherein the first process is an upstream process on a conveyor and the second process is a downstream process on the conveyor.

3. The method of claim 1, further comprising:
    determining that other sensor data received at a different time instance indicate that the first process is not waiting on the robot, in response to determining that the other sensor data indicating that the first process is not waiting on the robot, controlling the robot to conduct one or more of work on the second process or return to standby,
    wherein the controlling the robot to work on the second process comprises: for the status being indicative of the second process waiting on the robot, controlling the robot to work on the second process to completion if another buffer feeding into the third process is not full, and returning the robot to standby if the another buffer into the third process is full; and for the status being indicative of the second process not waiting on the robot, returning the robot to standby.

4. The method of claim 1, wherein the controlling the robot to work on the first process further comprises:

for a releasing of the buffer feeding from the second process to the third process and for the status being indicative of the second process waiting on the robot:

logging a current work step of the robot on the first process;

controlling the robot to work on the second process to completion; and controlling the robot to resume working on the first process from the logged current work step after completion of the second process.

5. The method of claim 3, wherein the controlling the robot to conduct one or more of work on the second process further comprises:

for a releasing of the buffer feeding into the second process and for the status being indicative of the first process waiting on the robot:

logging a current work step of the robot on the second process; controlling the robot to work on the first process to completion; and controlling the robot to resume working on the second process from the logged current work step after completion of the first process.

6. A non-transitory computer readable medium, storing instructions for operation of a robot configured to work on a first process and a second process, the instructions comprising:

receiving sensor data indicative of a status of one or more of the first process and the second process;

for the status indicative of the first process waiting on the robot, controlling the robot to work on the first process; and for the status indicative of the first process not waiting on the robot, controlling the robot to conduct one or more of work on the second process or return to standby, wherein the controlling the robot to work on the second process comprises: for the status being indicative of the second process waiting on the robot, controlling the robot to work on the second process to completion if a buffer feeding into a third process is not full, and returning the robot to standby if the buffer into the third process is full.

7. The non-transitory computer readable medium of claim 6, wherein the first process is an upstream process on a conveyor and the second process is a downstream process on the conveyor.

8. The non-transitory computer readable medium of claim 6, wherein the controlling the robot to work on the first process comprises:

for a buffer feeding into the second process not being full, work on the first process to completion; and for the buffer feeding into the second process being full, determining if the status is indicative of the second process waiting for the robot; and for the status being indicative of the second process waiting on the robot, controlling the robot to work on the second process to completion if another buffer feeding into the third process is not full, and returning the robot to standby if the another buffer into the third process is full.

9. The non-transitory computer readable medium of claim 6, wherein the controlling the robot to work on the second process further comprises:

for the status being indicative of the second process not waiting on the robot, returning the robot to standby.

10. The non-transitory computer readable medium of claim 6, wherein the controlling the robot to work on the first process comprises:

for a releasing of a buffer feeding from the second process to the third process and for the status being indicative of the second process waiting on the robot:

logging a current work step of the robot on the first process;

controlling the robot to work on the second process to completion; and controlling the robot to resume working on the first process from the logged current work step after completion of the second process.

11. The non-transitory computer readable medium of claim 6, wherein the controlling the robot to conduct one or more of work on the second process further comprises:

for a releasing of a buffer feeding into the second process and for the status being indicative of the first process waiting on the robot:

logging a current work step of the robot on the second process;

controlling the robot to work on the first process to completion; and controlling the robot to resume working on the second process from the logged current work step after completion of the first process.

12. A robot controller, configured to operate a robot to work on a first process and a second process, the robot controller comprising:

one or more computer readable mediums storing instructions; and a processor, configured to read the instructions from the one or more computer readable mediums to execute a process comprising:

receiving sensor data indicative of a status of one or more of the first process and the second process;

for the status indicative of the first process waiting on the robot, controlling the robot to work on the first process; and for the status indicative of the first process not waiting on the robot, controlling the robot to conduct one or more of work on the second process or return to standby, wherein the instructions for controlling the robot to work on the second process comprises: for the status being indicative of the second process waiting on the robot, controlling the robot to work on the second process to completion if a buffer feeding into a third process is not full, and returning the robot to standby if the buffer into the third process is full.

13. The robot controller of claim 12, wherein the first process is an upstream process on a conveyor and the second process is a downstream process on the conveyor.

14. The robot controller of claim 12, wherein the instructions for controlling the robot to work on the first process further comprises:

for a buffer feeding into the second process not being full, work on the first process to completion; and for the buffer feeding into the second process being full, determining if the status is indicative of the second process waiting for the robot.

15. The robot controller of claim 12, wherein the instructions for controlling the robot to work on the second process comprises:

for the status being indicative of the second process waiting on the robot, controlling the robot to work on the second process to completion if another buffer feeding into the third process is not full, and returning the robot to standby if the another buffer into the third process is full; and for the status being indicative of the second process not waiting on the robot, returning the robot to standby.

16. The robot controller of claim 12, wherein the instructions for controlling the robot to work on the first process further comprises:

for a releasing of a buffer feeding from the second process to the third process and for the status being indicative of the second process waiting on the robot:

logging a current work step of the robot on the first process;

controlling the robot to work on the second process to completion; and controlling the robot to resume working on the first process from the logged current work step after completion of the second process.

17. The robot controller of claim 12, wherein the instructions for controlling the robot to conduct one or more of work on the second process comprises:

for a releasing of a buffer feeding into the second process and for the status being indicative of the first process waiting on the robot:

logging a current work step of the robot on the second process;

controlling the robot to work on the first process to completion; and controlling the robot to resume working on the second process from the logged current work step after completion of the first process.

* * * * *